United States Patent
Frey et al.

(10) Patent No.: US 12,026,595 B2
(45) Date of Patent: Jul. 2, 2024

(54) METHOD AND SYSTEM FOR DETECTING BUILDING OBJECTS INSTALLED WITHIN A BUILDING

(71) Applicant: Siemens Schweiz AG, Zürich (CH)

(72) Inventors: Christian Frey, Unterägeri (CH); Oliver Zechlin, Zug (CH)

(73) Assignee: SIEMENS SCHWEIZ AG, Zurich (CH)

(*) Notice: Subject to any disclaimer, the term of this patent is extended or adjusted under 35 U.S.C. 154(b) by 386 days.

(21) Appl. No.: 17/422,399

(22) PCT Filed: Nov. 14, 2019

(86) PCT No.: PCT/EP2019/081259
§ 371 (c)(1),
(2) Date: Jul. 12, 2021

(87) PCT Pub. No.: WO2020/147996
PCT Pub. Date: Jul. 23, 2020

(65) Prior Publication Data
US 2022/0122358 A1  Apr. 21, 2022

(30) Foreign Application Priority Data
Jan. 14, 2019 (EP) ..................... 19151592

(51) Int. Cl.
*G06V 20/70* (2022.01)
*G06F 30/20* (2020.01)
(Continued)

(52) U.S. Cl.
CPC ............. *G06N 20/00* (2019.01); *G06F 30/20* (2020.01); *G06V 10/225* (2022.01);
(Continued)

(58) Field of Classification Search
CPC ........ G06N 20/00; G06N 20/70; G06N 20/10; G06N 20/50; G06F 30/20; G06V 10/772;
(Continued)

(56) References Cited

U.S. PATENT DOCUMENTS 8,060,254 B2 * 11/2011 Myeong ............... G05D 1/0246
701/25
9,734,169 B2 * 8/2017 Redlich ................... G06F 16/21
(Continued)

FOREIGN PATENT DOCUMENTS

| WO | 2015 017796 | 2/2015 | .............. G06K 9/00 |
| WO | 2018 005369 | 1/2018 | .............. G06K 9/82 |
| WO | WO-2018203512 A1 * | 11/2018 | .......... B62B 5/0096 |

OTHER PUBLICATIONS

Search Report for International Application No. PCT/EP2019/081259, 28 pages, dated May 27, 2020.
(Continued)

*Primary Examiner* — Shefali D Goradia
(74) *Attorney, Agent, or Firm* — Slayden Grubert Beard PLLC

(57) ABSTRACT

Various embodiments of the teachings herein include a building object detection system for a building comprising: a scanner to generate scan data; an artificial intelligence module implemented on a processing unit trained to process the scan data to detect and automatically classify building objects installed within the space; a database to store different types of building objects and associated installation rules; and a verification unit to verify the classification of a building object based on compliance with the installation rules. The AI is trained using labeled training data comprising labels derived from scan data of previously scanned building objects provided with associated object identifiers.

(Continued)

A second set of installation rules is loaded from the database based at least in part on a location of the building.

16 Claims, 5 Drawing Sheets

(51) Int. Cl.

| | |
|---|---|
| *G06N 20/00* | (2019.01) |
| *G06V 10/22* | (2022.01) |
| *G06V 10/24* | (2022.01) |
| *G06V 10/764* | (2022.01) |
| *G06V 10/772* | (2022.01) |
| *G06V 10/82* | (2022.01) |
| *G06V 20/10* | (2022.01) |
| *G06V 20/50* | (2022.01) |

(52) U.S. Cl.
CPC .......... *G06V 10/245* (2022.01); *G06V 10/764* (2022.01); *G06V 10/772* (2022.01); *G06V 10/82* (2022.01); *G06V 20/10* (2022.01); *G06V 20/50* (2022.01); *G06V 20/70* (2022.01)

(58) Field of Classification Search
CPC .... G06V 10/82; G06V 10/764; G06V 10/225; G06V 10/245
See application file for complete search history.

(56) References Cited

U.S. PATENT DOCUMENTS

| | | | |
|---|---|---|---|
| 11,295,167 B2* | 4/2022 | Rodriguez | G06V 20/00 |
| 2002/0164052 A1 | 11/2002 | Reed | 382/100 |
| 2016/0328660 A1* | 11/2016 | Huang | G07G 1/0045 |

OTHER PUBLICATIONS

Thomas Kalweit et al: "Kapitel 7: IT-Grundlagen für Facility Manager" In: "CAFM-Handbuch : IT Im Facility Management Erfolgreich Einsetzen", Springer Vieweg Fachmedien Wiesbaden GmbH, XP055695107, ISBN: 978-3-642-30502-3, pp. 147-196, Jan. 2, 2013.

Youtube video: "Mobile Barcode-Inventarisierung mit App" veröffentlicht durch die eTASK Immobilien Software GmbH am, NJ69qvolbXs, XP54980470; 1 page, Jul. 21, 2016.

Rip Empson: "EZOfficeInventory Lets SMBs Easily Track And Manage Company Assets (In The Cloud)", XP055694872, 2 pages, Aug. 13, 2011.

Quick Darren: "Hidden RFID tags could mean end of bar-codes and lines at the checkout", XP055662329, Retrieved from the Internet; 12 pages, Jan. 27, 2020.

Zhibo Yang et al: "Robust and Fast Decoding of High-Capacity Color QR Codes for Mobile Applications", arxiv.org, Cornell University Library, 201 Olin Library Cornell University Ithaca, NY 14853, XP081150153, DOI: 10.1109/TIP.2018.2855419, 15 pages, Apr. 21, 2017.

* cited by examiner

METHOD AND SYSTEM FOR DETECTING BUILDING OBJECTS INSTALLED WITHIN A BUILDING

CROSS-REFERENCE TO RELATED APPLICATIONS

This application is a U.S. National Stage Application of International Application No. PCT/EP2019/081259 filed Nov. 14, 2019, which designates the United States of America, and claims priority to EP Application No. 19151592.3 filed Jan. 14, 2019, the contents of which are hereby incorporated by reference in their entirety.

TECHNICAL FIELD

The present disclosure relates to building services. Various embodiments of the teachings herein may include computer-implemented methods and/or building object detection systems for detecting building objects installed within a building at a fixed position, in particular building installation devices providing building services.

BACKGROUND

US 2016/328660 A1 describes a machine learning arrangement for a point-of-sale systems which includes a scanner component. The scanner component scans a barcode, a QR code, an RFID or another code. The arrangement further comprises a camera component, which gets an image or picture of objects, and a compute component with a prediction algorithm to classify the object.

WO 2015/017796 A2 describes a learning system which can be trained by a plurality of training images.

WO 2018/005369 A1 describes a camera system for inventory monitoring. The system includes a movable base that supports multiple cameras. The multiple cameras are directed toward inventory to take a series of pictures along an aisle of a retail store or warehouse.

In many use cases, it is necessary to detect building objects or static objects installed within a public or private building. For instance, it can be desired to provide an inventory of building objects located within a building such as a factory. Further, it may be necessary to check whether safety requirements have been fulfilled such as a sufficient number of smoke detectors within rooms of a building. However, the detection and annotation of devices in a building using a conventional scanner is time-consuming and cumbersome since it is based on manual visual identification of building objects performed by an operator. Moreover, the visual identification of building objects based on images or scanned data by an operator is error-prone because the operator might overlook building objects within the generated images or scan data.

SUMMARY

The teachings of the present disclosure include methods and systems for detecting building objects installed within a building efficiently. For example, some embodiments of the teachings herein include a building object detection system (1) for detecting building objects (OBJ) installed at fixed predefined positions in a building, the system (1) comprising: at least one scanner (2) adapted to scan a space within the building to generate scan data (SD) of the respective scanned space; at least one artificial intelligence module (3) implemented on a processing unit (5) of said building object detection system (1) adapted to process scan data (SD) generated by the at least one scanner (2) to detect and classify automatically building objects (OBJ) installed within the scanned space, wherein the artificial intelligence module (3) is trained by the processing unit (5) with labeled training data (LTD) comprising labels (L) derived from scan data (SD) of previously scanned building objects (OBJ) provided with associated object identifiers (OBJ-ID) within the vicinity of the respective installed building objects (OBJ); a database (8) adapted to store different types of building objects (OBJ) and associated installation rules (IR) for installation of building objects (OBJ) within buildings; and a verification unit (7) adapted to verify the classification of a building object (OBJ) based on the installation rules (IR) for installation of building objects (OBJ) within buildings stored in the database (8), wherein a different set of installation rules (IR) is loaded from the database (8) depending on a position of a location of the building.

In some embodiments, the at least one scanner (2) is mounted to a remote-controlled or to an autonomously driving robot (4) of the system (1), wherein the driving robot (4) is moveable within the building to supply scan data (SD) of a scanned space within said building to the trained artificial intelligence module (3) implemented on a local processor of said driving robot (4) or on a local controller of a network of said building or implemented on a remote server of a cloud platform to detect and classify building objects (OBJ) installed within the scanned space of the building.

In some embodiments, the scan data (SD) generated by the at least one scanner (2) mounted to the driving robot (4) comprise point cloud data, and/or image data, radar data and/or acoustic data.

In some embodiments, the trained artificial intelligence module (3) comprises a trained deep neural network.

In some embodiments, the trained artificial intelligence module (3) receives scan data (SD) from different scanners (2), wherein a classification of a building object (OBJ) based on scan data (SD) provided by one scanner (2) is verified by the verification unit (7) of the system (1) based on scan data (SD) provided by another scanner (2).

In some embodiments, the detected and classified building objects (OBJ) installed within the scanned spaces of the building are stored in the database (8) of the system (1) and processed by a processing unit (5) of the system (1) to generate a digital twin (DT) of the scanned physical building, wherein the digital twin (DT) forms a real-time digital replica of the scanned physical building.

In some embodiments, the generated digital twin (DT) of the scanned physical building is compared with a digital planning model of the same building stored in the database (8) to detect automatically deviations between the physical scanned building and the planned building.

In some embodiments, the scan data (SD) generated by the at least one scanner (2) comprises georeferenced scan data (SD) processed by a processor of the system (1) to determine a position of the detected building object (OBJ).

In some embodiments, the determined position of the detected and classified building object (OBJ) is compared with building plan data of the building to verify the classification of the respective building object (OBJ) performed by the trained artificial intelligence module (3).

In some embodiments, the building object (OBJ) detected and classified by the artificial intelligence module (3) is provided with annotation data and stored in the database (8) of the system (1).

In some embodiments, the scanner (2) mounted to the moveable driving robot (4) is automatically moved to a location within the building indicated by coordinates of a building object (OBJ) specified in a digital twin (DT) of the building to scan the surrounding of the indicated location.

In some embodiments, the building objects (OBJ) installed in the building and detected by the building object detection system (1) comprise: security and alarm installation devices, in particular temperature sensors, fire detection devices, fire protection devices, lightning protection devices, communication installation devices, in particular telephone sockets and/or radio sockets and communication lines, artificial lighting devices, electrical switches and electrical sockets and power supply lines, energy supply installation devices, heating and cooling installation devices, ventilation installation devices, water supply and drainage installation devices, and/or escalators and lift installation devices, windows and doors.

In some embodiments, the object identifiers (OBJ-ID) used for providing labeled training data (LTD) for the artificial intelligence module (3) comprise hierarchical classifications and/or object attributes.

In some embodiments, the object identifiers (OBJ-ID) placed in the vicinity of installed building objects (OBJ) and used for providing labeled training data (LTD) for the artificial intelligence module (3) provide absolute or relative position information.

As another example, some embodiments include a computer-implemented method for detecting building objects (OBJ) installed at fixed predefined positions within a building, the method comprising the steps of: scanning ($S1_{IPH}$) a space within the building to generate scan data (SD) of the respective scanned space; and processing ($S2_{IPH}$) the generated scan data (SD) by an artificial intelligence module (3) to detect and classify automatically building objects (OBJ) installed within the scanned space, wherein the artificial intelligence module (3) is trained with labeled training data (LTD) comprising labels (L) derived from scan data (SD) of previously scanned building objects (OBJ) provided with associated object identifiers (OBJ-ID) within the vicinity of the respective installed building objects (OBJ), wherein different types of building objects (OBJ) and associated installation rules (IR) for installation of building objects (OBJ) within buildings are stored in a database (8), wherein a different set of installation rules (IR) is loaded from the database (8) depending on a position of a location of the building, and wherein the classification of a building object (OBJ) is verified based on the installation rules (IR) for installation of building objects (OBJ) within buildings loaded from the database.

As another example, some embodiments include a method for training an artificial intelligence module (3) implemented in a processing unit (5) of a building object detection system (1) as described herein, said training method comprising the steps of: attaching ($S1_{TPH}$) physically object identifiers (OBJ-ID) within a vicinity of building objects (OBJ) installed in the building; scanning ($S2_{TPH}$) a space within the building to generate scan data (SD) of the respective scanned space; processing ($S3_{TPH}$) the generated scan data (SD) to derive labels (L) from the object identifiers (OBJ-ID) included in the scan data (SD); annotating ($S4_{TPH}$) automatically the scan data (SD) with the derived labels (L) to provide labeled training data (LTD); and training ($S5_{TPH}$) the artificial intelligence module (3) with the labeled training data (LTD).

As another example, some embodiments include a driving robot (4) comprising at least one scanner (2) adapted to generate scan data (SD) of a scanned space within a building, wherein the generated scan data (SD) is supplied to an artificial intelligence module (3) implemented on a processing unit (5) of a building object detection system (1) as described herein to detect building objects (OBJ) installed in the building.

BRIEF DESCRIPTION OF THE DRAWINGS

In the following, possible embodiments of the different aspects of the present teachings are described in more detail with reference to the enclosed figures.

DETAILED DESCRIPTION

Figure 1:
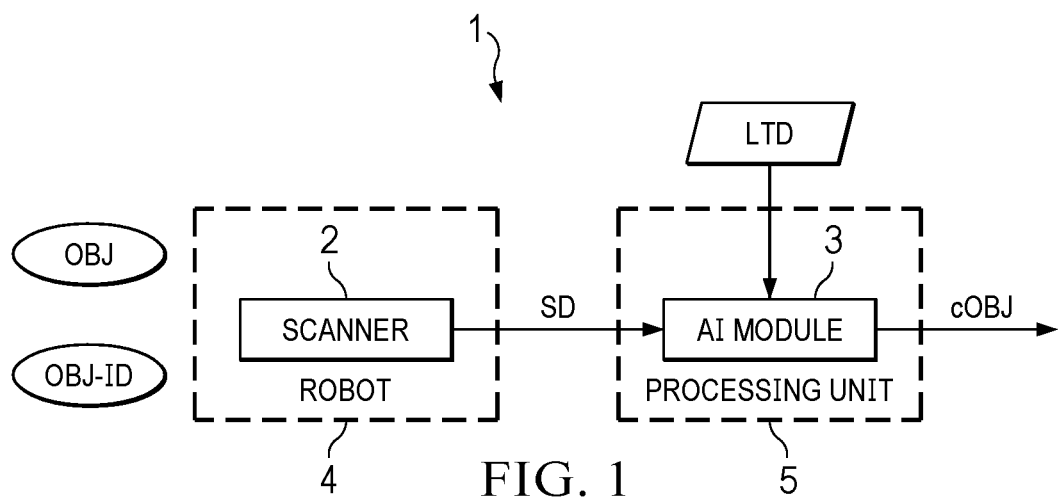
FIG. 1 shows a block diagram of a possible exemplary embodiment of a building object detection system for detection of building objects installed within a building incorporating teachings of the present disclosure.

Some embodiments of the teachings herein include a building object detection system used for detecting building objects installed in a building wherein the building object detection system comprises: at least one scanner adapted to scan a space within the building to generate scan data of the respective scanned space and at least one artificial intelligence module, AIM, implemented on a processing unit of said building object detection system adapted to process scan data generated by the at least one scanner to detect and classify automatically building objects installed within the scanned space, wherein the artificial intelligence module, AIM, is trained with labeled training data comprising labels derived from scan data of previously scanned building objects provided with associated object identifiers within the vicinity of the respective installed building objects.

The building object detection systems described herein allow building objects installed within a building to be detected fast and reliably. In some embodiments, the associated object identifiers comprise visible object identifiers. In some embodiments, the visible object identifiers comprise a one-dimensional barcode, a two-dimensional QR code and/or a three-dimensional code.

In some embodiments, the associated object identifiers comprise invisible object identifiers. In a possible embodiment, the invisible object identifiers comprise electromagnetic signal object identifiers adapted to provide electromagnetic identification signals in an invisible frequency range.

In some embodiments, the at least one scanner is mounted on a remote-controlled or to an autonomously driving robot of the building object detection system. The driving robot is moveable within the building to supply scan data of a scanned space within the building to the trained artificial intelligence module, AIM, of the building object detection system.

In some embodiments, the artificial intelligence module, AIM, is implemented on a local processor of the driving robot.

In some embodiments, the artificial intelligence module, AIM, is implemented on a local controller of a network of the building.

In some embodiments, the artificial intelligence module, AIM, is implemented on a remote server of a cloud platform to detect and classify building objects installed within the scanned space of the building.

In some embodiments, the scan data generated by the at least one scanner mounted to the driving robot of the building object detection system comprise point cloud data, and/or image data, radar data and/or acoustic data.

In some embodiments, the trained artificial intelligence module, AIM, comprises a trained deep neural network.

In some embodiments, the trained artificial intelligence module, AIM, receives scan data from different scanners, wherein a classification of a building object based on scan data provided by one scanner is verified by a verification unit of the building object detection system based on scan data provided by another scanner. The classification of a building object is verified by the verification unit of the building object detection system based on predetermined installation rules for installation of building objects within buildings.

In some embodiments, the detected and classified building objects installed within the scanned spaces of the building are stored in a database of the building object detection system and processed by a processing unit of the building object detection system to generate a digital twin of the scanned physical building, wherein the digital twin forms a real-time digital replica of the scanned physical building.

In some embodiments, the generated digital twin of the scanned physical building is compared with a digital planning model of the same building stored in a database to detect automatically deviations between the physical scanned building and the planned building. In case that deviations are detected, corresponding measures can be automatically triggered by a controller of the building object detection system.

In some embodiments, the scan data generated by the at least one scanner comprises georeferenced scan data processed by a processor of the building object detection system to determine a position of the detected building object.

In some embodiments, the determined position of the detected and classified building object is compared with building plan data of the building to verify automatically the classification of the respective building object performed by the trained artificial intelligence module, AIM.

In some embodiments, the building object detected and classified by the artificial intelligence module, AIM, is provided with annotation data and stored in a database of the system.

In some embodiments, the scanner mounted to the moveable driving robot is automatically moved to a location within the building indicated by coordinates of a building object specified in a digital twin of the building to scan the surrounding of the indicated location.

In some embodiments, the building objects installed in the building and detected by the building object detection system comprise security and alarm installation devices, in particular temperature sensors, fire detection devices, fire protection devices, lightning protection devices, communication installation devices, in particular telephone sockets and/or radio sockets and communication lines, artificial lighting devices and lamps, electrical switches, electrical sockets and power supply lines, energy supply installation devices, heating and cooling installation devices, ventilation installation devices, water supply and drainage installation devices, escalators and lift installation devices, windows and/or doors installed in the building.

In some embodiments, the object identifiers used for providing labeled training data for the artificial intelligence module, AIM, comprise hierarchical classifications and/or object attributes. By using hierarchical classifications the training of the artificial intelligence module, AIM, can be improved and accelerated.

In some embodiments, the object identifiers placed in the vicinity of installed building objects and used for providing labeled training data for the artificial intelligence module, AIM, provide absolute or relative position information.

Some embodiments include a computer-implemented method for detecting building objects installed within a building comprising the features described herein.

Some embodiments include a computer-implemented method for detecting building objects installed within a building, wherein the method comprises the steps of: scanning a space within a building to generate scan data of the respective scanned space; and processing the generated scan data by an artificial intelligence module, AIM, to detect and classify automatically building objects installed within the scanned space, wherein the artificial intelligence module, AIM, is trained with labeled training data comprising labels derived from scan data of previously scanned building objects provided with associated object identifiers within the vicinity of the respective installed building objects.

Some embodiments include a method for training an artificial intelligence module, AIM, implemented in a processing unit of a building object detection system according to the first aspect of the present invention, wherein the training method comprises the steps of: attaching physically object identifiers within a vicinity of building objects installed in the building, scanning a space within the building to generate the scan data of the respective scanned space, processing the generated scan data to derive labels from the object identifiers included in the scan data, annotating automatically the scan data with the derived labels to provide labeled training data and training the artificial intelligence module, AIM, with the labeled training data.

Some embodiments include a driving robot comprising at least one scanner adapted to generate scan data of a scanned space within a building, wherein the generated scan data is supplied to an artificial intelligence module, AIM, implemented on a processing unit of a building object detection system as described herein used to detect building objects installed in the building.

As can be seen in the schematic block diagram of FIG. 1, a system 1 for detection of building objects OBJ installed within a building according to an aspect of the present invention comprises in the illustrated embodiment at least one scanner 2 and at least one artificial intelligence module 3. The scanner 2 can be mounted in a possible exemplary embodiment to a robot 4 as illustrated in the schematic block diagram of FIG. 1. Further, the artificial intelligence module 3 may be implemented in a possible exemplary embodiment on a processing unit 5 as shown in FIG. 1. The building object detection system 1 used for detecting building objects OBJ installed within a building such as an office building or a factory can comprise one or more scanners 2 adapted to generate scan data SD supplied by the scanner 2 to the artificial intelligence module 3 implemented on the processing unit 5. The building object detection system 1 can comprise one or more scanners 2 or scanning devices 2 supplying scan data SD to the artificial intelligence module 3. The one or more scanners 2 can be mounted on a robot 4 moving within rooms of a building. The robot 4 can in a possible embodiment be remote-controlled.

In some embodiments, the robot 4 is moving autonomously within the scanned building. The scanner 2 is adapted to scan a surrounding space within the building to generate the scan data SD of the scanned space and supply the scan data SD to the artificial intelligence module 3 implemented in the processor or processing unit 5 of the building object detection system 1. The artificial intelligence module 3 is adapted to process the received scan data SD to detect and classify automatically building objects OBJ installed within the scanned space. The artificial intelligence module 3 is trained with labeled training data LTD comprising labels L derived automatically from scan data SD of previously scanned building objects OBJ provided with associated object identifiers OBJ-ID. The scanned building objects OBJ can be for example smoke detectors with associated object identifiers OBJ-ID such as visible codes. In a possible embodiment, the trained artificial intelligence module 3 is implemented in a local processor of the moveable robot 4. In an alternative embodiment, the artificial intelligence module 3 is implemented on a local controller of a network of the building scanned by the scanner 2. In a still further possible embodiment, the artificial intelligence module 3 is implemented on a remote server of a cloud platform.

Figure 2:
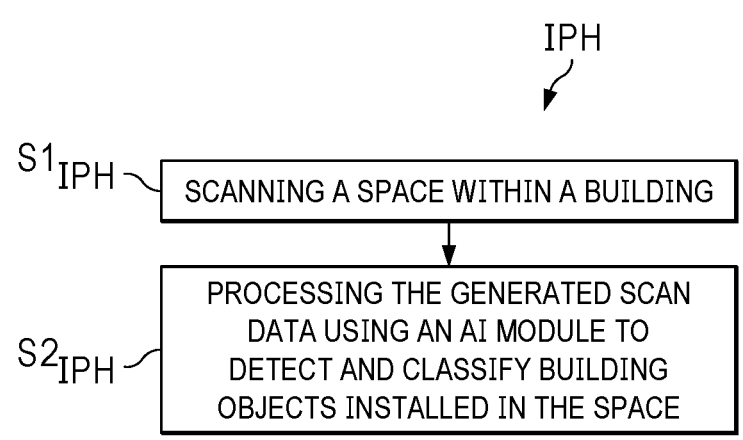
FIG. 2 shows a flowchart of a possible exemplary embodiment of a computer-implemented method for detecting building objects installed within a building incorporating teachings of the present disclosure.

FIG. 2 shows a flowchart of a possible exemplary embodiment of a computer-implemented method for detecting building objects OBJ installed within a building. The building objects OBJ installed in the building and detectable by the building object detection system 1 incorporating teachings of the present disclosure can comprise a wide variety of different installed building objects OBJ. The building objects OBJ are located at a predefined fixed position within a room of the building. The building objects OBJ can comprise security and alarm installation devices such as temperature sensors, fire detection devices, fire protection devices or lightning protection devices. The fire detection devices can comprise for instance smoke detectors.

The building objects OBJ can also comprise communication installation devices such as telephone sockets and/or radio sockets as well as communication lines. The building objects OBJ installed in a room of the building can include lamps or lighting devices providing artificial light within a room of the building. Further, the building objects OBJ installed in the buildings can comprise switches and electrical sockets as well as power supply lines installed in the building. The building objects OBJ can moreover comprise energy supply installation devices. Further, the detectable building objects OBJ can comprise heating and/or cooling installation devices and ventilation installation devices such as fans.

The building objects OBJ can further comprise water supply and/or drainage installation devices. A further example for building objects OBJ comprise escalators and lift installation devices. Also, windows and doors installed in the building form building objects OBJ installed in the building at predefined positions according to the building plan of the building. Some building objects OBJ form an integral part of the building, i.e., they cannot be easily removed or replaced. Other building objects OBJ can be removed and/or replaced but are still located at a fixed predefined position of the building. For example, fire extinguisher devices are located at predefined locations in the building, however, after a certain lifetime, the fire extinguisher devices are replaced by new fire extinguisher devices.

Most of the building objects OBJ installed in the building are installed according to predefined installation rules IR depending on the type of the building object. Installation rules IR may be very strict for safety-critical installation devices and more general for less critical building objects OBJ. The different types of building objects OBJ and the associated installation rules IR can be stored in a possible embodiment in a database 8 of the building object detection system 1. Installation rules IR can be used to support the classification of building objects OBJ within the computer-implemented methods described herein.

In the illustrated embodiment, the computer-implemented method comprises two main steps. The detection of building objects OBJ can be performed in an inference phase IPH by the already trained artificial intelligence module 3. The trained artificial intelligence module 3 is able to classify also building objects OBJ which do not comprise an associated object identifier OBJ-ID.

In a first step $S1_{IPH}$, a space within the building is scanned by at least one scanner 2 of the system 1 to generate scan data SD of the respective scanned space.

Figure 5:
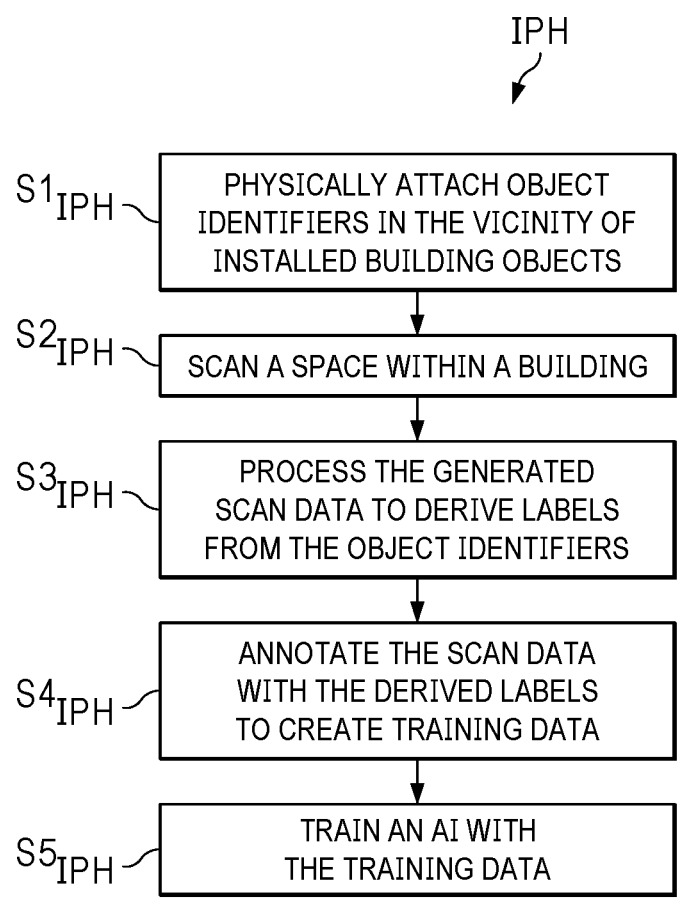
FIG. 5 shows a flowchart of a possible embodiment of a training procedure for training an artificial intelligence module of a building object detection system incorporating teachings of the present disclosure.

In a further step $S2_{IPH}$, the generated scan data SD is processed by an artificial intelligence module 3 to detect and classify automatically building objects OBJ installed within the scanned space. The artificial intelligence module 3 has been trained in a training phase TPH and/or during operation of the building object detection system 1 with labeled training data LTD comprising labels L derived from scan data SD of previously scanned building objects OBJ provided with associated object identifiers OBJ-ID. The training of the artificial intelligence module 3 in a training phase TPH is illustrated in FIG. 5.

In some embodiments, the associated object identifiers OBJ-ID comprise visible object identifiers OBJ-ID which can be attached to a housing of the building object or which can be provided within a vicinity of the respective building object. For instance, associated object identifiers OBJ-ID can comprise a visible code attached to the housing of the building object or provided within a predetermined range around the respective building object. For instance, if the building object is a smoke detector mounted to a ceiling of a room within the building, the visible code forming the object identifier OBJ-ID can be either attached to the housing of the smoke detector or fixed to the ceiling of the room close to the smoke detector, e.g. by means of a sticker in a predetermined radius r of e.g. 30 cm around the smoke detector. The visible code can be in a possible embodiment a one-dimensional barcode. In a preferred embodiment, the visible code can comprise a two-dimensional QR code. In a still further alternative embodiment, the visible code forming the object identifier OBJ-ID can also comprise a three-dimensional code.

The at least one scanner 2 providing scan data SD in step can be in a possible embodiment a camera adapted to provide image data. Image data forms scan data SD which can be processed by the artificial intelligence module 3. The image data can be generated in a possible embodiment in different frequency ranges. In a possible embodiment, the image data generated by the scanner 2 can comprise visible image data in the visible frequency range. In a further possible embodiment, the generated image data can comprise data generated in an invisible frequency range, i.e., not visible to human eyes such as infrared data. The scanner 2 used to generate scan data SD can also comprise a two-dimensional or a three-dimensional scanner 2, in particular a three-dimensional laser scanning device generating point cloud data. A point cloud comprises a set of data points in a predetermined scanned space. Point cloud data is generated by the scanner 2 which measures a large number of points on the external surface of objects surrounding it. As an output of the 3D scanning process scan data SD comprising point cloud data can be supplied to the artificial intelligence module 3 for further processing. The following processing step $S2_{IPH}$ can be performed in real time.

In some embodiments, the scanner 2 can also be used to generate acoustic data as scan data SD. In a still further possible embodiment, the scan data SD can also comprise radar data of radar signals reflected by objects in the surrounding of the scanner 2. In step $S1_{IPH}$ as shown in FIG. 2, the space surrounding the moving robot 4 within the building can be scanned by different kinds of scanning devices 2, in particular cameras, laser scanners, radar scanners and/or acoustic scanning devices. The scan data SD generated by the one or more scanning devices 2 are transferred to at least one trained artificial intelligence module 3.

In some embodiments, the artificial intelligence module 3 comprises a trained deep neural network DNN. In a possible implementation, the deep neural network DNN is a trained convolutional neural network CNN used to detect automatically a respective object. In some embodiments, the trained artificial intelligence module 3 receives scan data SD from different scanners 2 or scanning devices 2 such as cameras, laser scanners 2, etc. In some embodiments, a classification of a building object based on scan data SD provided by one scanner 2 such as a camera is verified in a further data processing step based on scan data SD provided by another scanner 2 such as a laser scanning device.

In some embodiments, the classification of an object can be further verified based on predetermined installation rules IR for installation of objects within buildings. Installation rules IR can for instance indicate where and in which manner specific types of objects have to be installed within a building. An installation rule IR can for instance comprise a rule indicating that a smoke detector has to be mounted at a minimum distance to another building object such as a window of the building. The installation rules IR can be stored in a database 8 accessible by the processing unit 5 of the system 1.

There can be a plurality of installation rules IR for different kinds of building objects OBJ such as smoke detectors or switching devices stored in a database 8 of the system 1 which can be used for verification of specified building objects OBJ.

In a possible embodiment, the scan data SD generated by the at least one scanner 2 can comprise georeferenced scan data SD processed to determine a position of the detected building object within the building. In some embodiments, the determined position of the detected and classified building object is compared with building plan data of the respective building to verify the classification of the respective building object formed by the trained artificial intelligence module 3. In some embodiments, the building object detected and classified by the artificial intelligence module 3 can be provided with annotation data and stored in a database 8 for further processing.

In some embodiments, the scan data SD generation step $S_{IPH1}$ and the object classification step $S_{IPH2}$ shown in the flowchart of FIG. 2 are followed by a verification step using different scan data sources 2 and/or installation rules IR and/or building plan data of the building. The verification increases the reliability of the classification results and the robustness of the building object detection against external influences.

Figure 3:
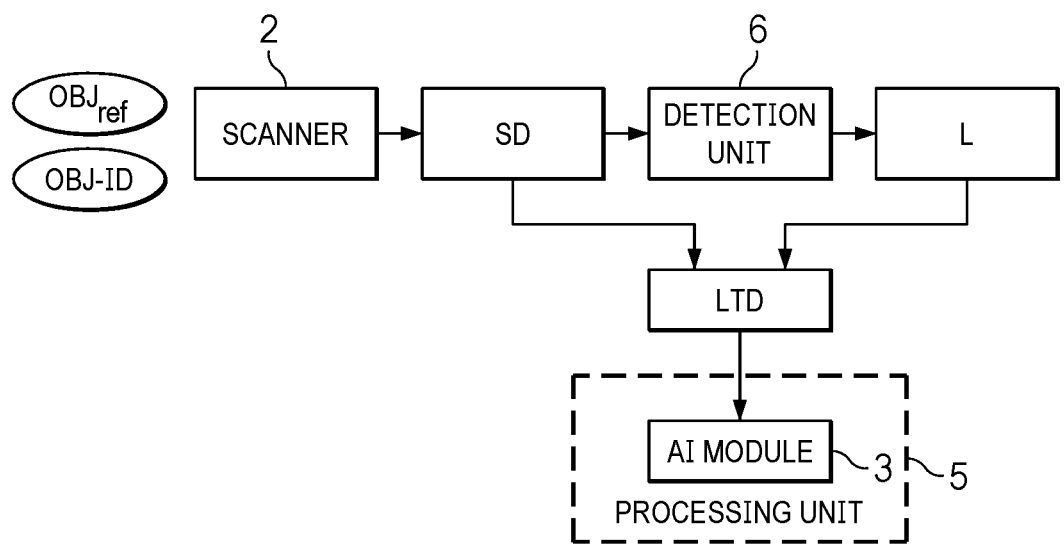
FIG. 3 shows a schematic diagram for illustrating the generation of labeled training data used for training of an artificial intelligence module used to detect objects installed within a building.

FIG. 3 shows a schematic diagram for illustrating the generation of training data used to train an artificial intelligence module 3 of the detection system 1 implemented on a processing unit 5. As can be seen in the schematic diagram of FIG. 3, a building object such as a smoke detector or any other building object installed within a building comprises an associated object identifier OBJ-ID such as a visible object code. The object code forming the object identifier OBJ-ID can be for instance a QR code attached to the housing of the building object or attached in a predetermined range around the installed building object.

A scan device 2 can be used to scan the building object and the associated object identifier OBJ-ID to generate scan data SD supplied to a code detection algorithm installed in an object identifier OBJ-ID detection unit 6 as illustrated in FIG. 3. The object identifier OBJ-ID detection unit 6 which runs e.g. a QR code detection algorithm can generate labels L derived from the received scan data SD to generate labeled training data LTD used for training the artificial intelligence module 3 in a training phase TPH. The object identifier OBJ-ID detection unit 6 can have access to a database 8 to generate the labels L and to extract and/or to retrieve associated labels L. The trained artificial intelligence module 3 can later be used in an inference phase IPH to perform the detection and classification of other installed physical building objects OBJ by means of at least one scanning device 2 moved by a robot 4 as illustrated in the block diagram of FIG. 1 or mounted on a trolley pushed by an operator through the building.

Figure 4:
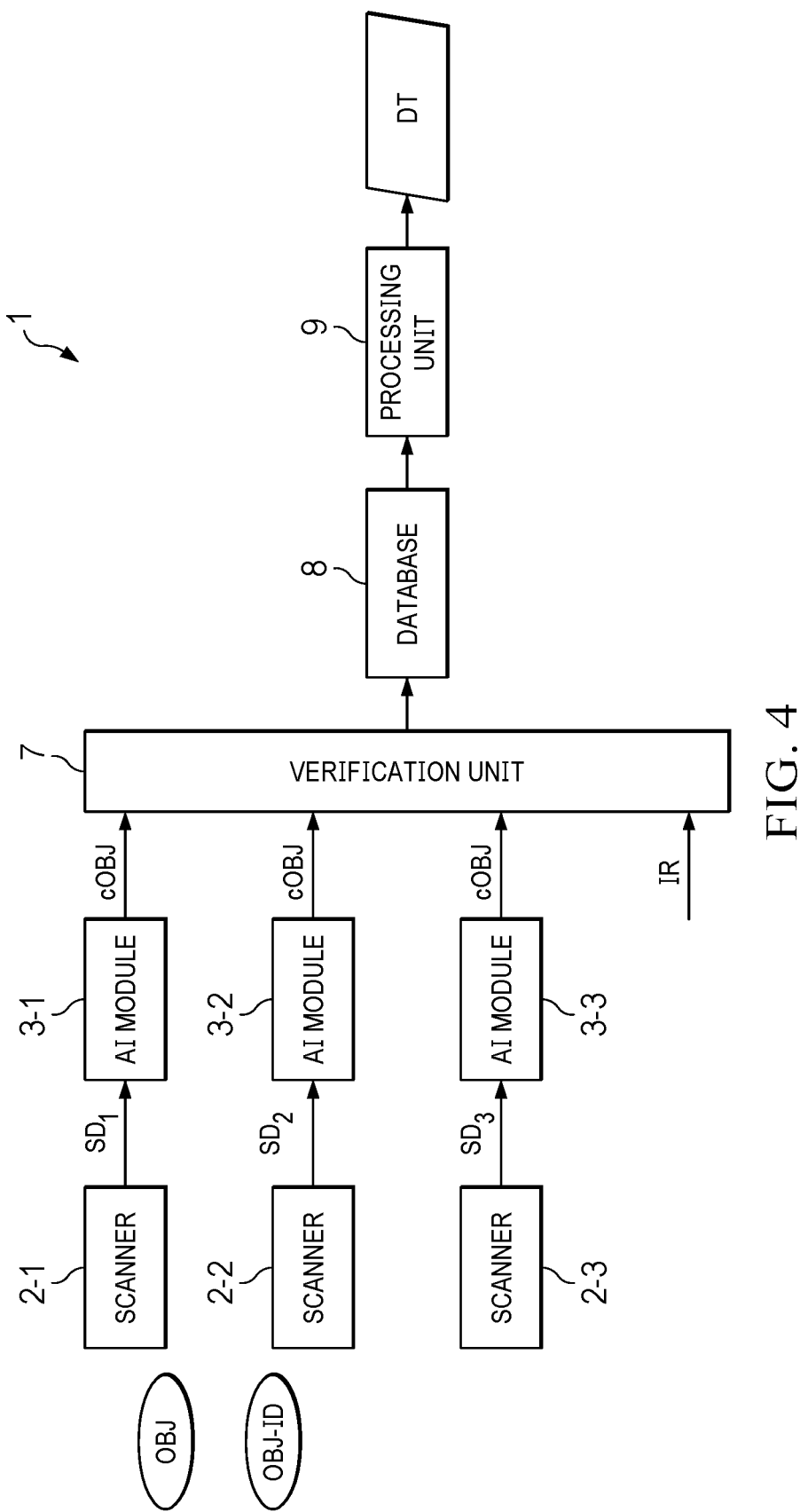
FIG. 4 shows a block diagram of a possible exemplary embodiment of a system for detection of building objects installed within a building incorporating teachings of the present disclosure.

FIG. 4 shows a block diagram of a further possible exemplary embodiment of a detection system 1 incorporating teachings of the present disclosure. In the illustrated embodiment, the building detection system 1 comprises more than one scanning devices or scanners 2-i. A first scanning device 2-1 can be an image source such as a camera providing images of the surrounding as scan data SD1 supplied to a first trained artificial intelligence module 3-1 used to classify building objects OBJ in the surrounding.

The building detection system 1 comprises in the illustrated embodiment a second scan device 2-2 which may generate as an image source a two-dimensional point cloud as scan data SD2. The two-dimensional point cloud is supplied in the illustrated embodiment to a second artificial intelligence module 3-2 used to classify building objects OBJ in the surrounding.

Further, the building detection system 1 comprises in the illustrated embodiment a third scanning device 2-3 such as a laser scanner generating a three-dimensional point cloud as scan data SD3 supplied to a third trained artificial intelligence module 3-3 used to classify building objects OBJ in the surrounding of the scanner 2-3.

In the illustrated embodiment of FIG. 4, the building detection system 1 comprises a verification unit 7 used to verify the correct classification of building objects OBJ. For instance, the verification unit 7 can use the classified building objects OBJ output by the different artificial intelligence modules 3-i to perform a verification whether the classified building objects OBJ have been classified correctly or not. For instance, if the classified building objects OBJ output by the different artificial intelligence modules 3-i are of the same class the verification unit 7 may verify the classification as successful.

In contrast, if the building objects OBJ classified by the different artificial intelligence modules 3-$i$ are different verification cannot be performed successfully by the verification unit 7. In a still further possible embodiment, the verification unit 7 can verify the classification of a building object based on predetermined installation rules IR for installation of building objects OBJ within buildings as also illustrated in the block diagram of FIG. 4.

The detected and classified building objects OBJ can be stored after successful verification by the verification unit 7 in a database 8 of the detection system 1. A processing unit 9 can in a possible embodiment generate a digital twin DT of the scanned building automatically based on the plurality of detected and classified building objects OBJ and building data such as a floor plan of the respective building. The digital twin DT comprises a real-time digital replica of the scanned physical building. The digital twin DT can be updated by the processing unit 9 in real time. The digital twin DT of the scanned building can be compared in a possible embodiment with a digital planning model of the same building to detect deviations between the physical scanned building and the planned building.

Depending on the detected deviations, actions can be triggered, for instance the installation of missing objects, in particular building objects OBJ such as smoke detectors. Further, determined positions of the detected and classified building objects OBJ can be compared by a processor with building plan data of the planned building to check whether the classification of the respective building object of the one or more trained artificial intelligence modules 3-$i$ was correct. The scanners 2, artificial intelligence modules 3 and the verification unit 7 as well as the database 8 and processing unit 9 may be integrated in the moveable robot 4 illustrated in FIG. 1, 6.

Further embodiments of the computer-implemented method and building detection system 1 are possible. In some embodiments, an indoor viewer can be used to generate points of interest POI.

A point of interest POI comprise points defined within a three-dimensional coordinate system 1 of an indoor viewer instance having additional information which may comprise GPS coordinates for indicating a specific position. More points of interest POI can comprise a type, a type group, and/or a position. A point of interest POI can be associated to objects in a three-dimensional scan.

In some embodiments, the artificial intelligence module 3 can comprise a deep learning artificial neural network DNN. In some embodiments, the artificial intelligence module 3 may be used for other kinds of machine learning algorithm. The artificial intelligence module 3 can be implemented in a possible embodiment in a graphical processing unit GPU. The artificial intelligence module 3 comprising an artificial neural network ANN for implementing a machine learning, ML, algorithm uses labeled training data LTD where the labeled training data LTD includes labels L derived automatically from scan data SD of previously scanned objects having associated object identifiers OBJ-ID. The previously scanned building objects OBJ can comprise in a possible embodiment reference building objects OBJ scanned in a training environment and/or scanned in the field, i.e. within the building.

In some embodiments, the labels L of the training data are derived from a two-dimensional QR code. A QR code comprises a quadratic matrix consisting of black and white squares representing the coded data in binary form. A QR code can be protected by an error correction code. A QR code can comprise a direct description of the respective object such as smoke detector "Sinteso FDOOT241-9" or can comprise a weblink. The scanner 2 can focus on the surrounding of the QR code and can assign the description to the detected building object based on the information encoded by the QR code.

Since building objects OBJ within buildings are mounted and installed according to functional directions and installation rules IR, it is also possible to provide a filtered association of the object selection. For instance, conventional standard smoke detectors are mounted within office buildings on the room ceiling. In many cases, such a norm or standard or even law includes instructions to maintain installation distances and similar information. These installation rules IR can be used for the building object detection by the building object detection system 1 as also illustrated in the embodiment of FIG. 4.

A possible installation rule IR can for instance be: "If the detected building object is a smoke detector there must be within the surrounding of x square meters and y meters a further smoke detector". This allows to exclude or include objects on a logic-semantic level. Installation rules IR can be used in a possible embodiment by the detection system 1 to increase the detection quality, for instance by implementing a verification unit 7 as illustrated in the embodiment of FIG. 4. A further example for an installation rule IR may be that a light switch has to be installed at the room wall at a height of 1 to 1.4 meters besides a passage.

In some embodiments, a point cloud forming scan data SD is evaluated for detecting and classifying objects. The evaluation of a point cloud can increase the detection quality when compared to a pure image-based detection. The point cloud data comprises depth information, e.g., the points not only comprise x and y coordinates but also z coordinates. This allows to recognize forms and geometries of building objects OBJ in a more reliable manner. Image recognition algorithms may use both point cloud data and/or two-dimensional photo/video data for object detection to further improve the qualified analytical result.

The number and types of scanning devices 2-$i$ can vary depending on the use case.

With the georeferencing of the scanning device, it is possible to determine also the WGS 84 coordinate (GPS) or data of an alternative coordinate system 1 such as UTM which makes it possible to annotate the building object in a two-dimensional or three-dimensional plan of the building. In a two-dimensional floor plan of the building it is also possible to place a corresponding symbol. Further, it is possible to transfer via an interface coordinates of another system 1 to the building objects OBJ. The detected building objects OBJ can comprise a variety of different building objects OBJ which can be provided within a building such as sensors or sensor devices, in particular smoke sensors or temperature sensors. Other building objects OBJ can comprise light switching units or other hardware components mounted in rooms of a building.

In some embodiments, a switching between different scanning devices 2-$i$ can be performed depending on the circumstances and/or an operation mode of the system 1. The scanning device 2-$i$ can comprise a camera generating images of the surrounding as scan data SD. In some embodiments, the scanning device 2-$i$ can comprise a camera which generates a video stream consisting of a plurality of images of the scanned space. The scanning device 2-$i$ can comprise in a possible embodiment a fisheye camera providing 360° images of the surrounding.

In some embodiments, a visible object identifier OBJ-ID such as a QR code can be attached to an associated building object, e.g. either directly on its housing or in its surrounding or vicinity. In some embodiments, the attached object identifier OBJ-ID can also comprise an identifier which is not ad hoc visible to the human eyes.

The invisible object identifiers OBJ-ID can comprise object identifiers OBJ-ID providing an electromagnetic signal not visible to the human eye such as radio signals, in particular Bluetooth or RFID signals, or optical signals in a not visible frequency range such as infrared signals.

In some countries, smoke detectors have to be mounted along with an associated object identifier OBJ-ID. These mandatory marking identifiers can be used as associated object identifiers OBJ-ID by the detection system 1. The object identifier OBJ-ID can be a mandatory marking formed by a text or sequence of characters attached to the housing of the object, in particular smoke detector, or provided in the vicinity of the building object.

The characters can comprise a coded address. If such an address is detected and recognized the probability is high that there is a physical building object such as a smoke detector in the direct surrounding of the coded address. The associated object identifier OBJ-ID can also comprise a three-dimensional code, for instance the form of the housing of the respective object. For instance, if smoke detectors have different housing forms the form of the respective housing can form an associated object identifier OBJ-ID used by the detection system 1 according to the present invention. In contrast, if different building objects OBJ have the same housing, an additional QR code may be used to identify the respective building object.

In some embodiments, the three-dimensional (3D) code can extend the two-dimensional QR code with an additional dimension, i.e. color. Each pixel or point in the two-dimensional code can comprise a color (wavelength A) encoding a value. This 3D code can be provided by LEDs. In such embodiments, the object identifiers OBJ-ID comprise a matrix of LEDs to provide a three-dimensional code.

In some embodiments, if the building object is included in the generated scan data SD an indoor viewer can be used to annotate the object at the determined position of the building object. The position of the building object can be referenced in the digital twin DT. For this, the WGS 84 position or the room position (distance wall, ceiling, floor) can be used. 360° images may comprise pixels which can be enriched with point cloud data generated through laser scans.

In some embodiments, additional labeled training data LTD is generated in the inference phase IPH during operation of the detection system 1 and stored in the database 8 of the system 1. The detection system 1 can be used to generate an inventory of the building including all detected and classified building objects OBJ as well as their positions within the building. The generated digital twin DT of the scanned building can be used for different purposes. In some embodiments, the generated digital twin DT of the scanned building can be compared with building data to recognize deviations from the building plan to trigger corresponding actions. In some embodiments, the digital twin DT can also be used to support service technicians performing services within the building. A digital twin DT forms machine readable data stored in the database 8 of the system 1.

Besides the scan data SD provided by the scanning devices 2-$i$ of the detection system 1, floor plans with space details and devices specified in a legend can be used as an additional input of the system 1. In some embodiments, a scanning device 2-$i$ can be used to scan a printed floor plan of the building and a corresponding legend of building objects OBJ installed in the building. The building object can comprise for instance smoke detectors, alarm devices, connectable switches or lamps. The generated image of the scanned floor plan can be uploaded. The recognition algorithm can make the images searchable so that it is possible to discover building objects OBJ and scenes that appear within them.

In some embodiments, a lambda function can be created that automatically adds newly detected image labels L directly into a search index when a new image has been uploaded. A recognition algorithm retrieves an image and returns labels L for the detected image. The returned images can be pushed along with confidence scores provided with search indices to provide the output digital twin DT. The scanning device 2-$i$ of the detection system 1 can capture images as scan data SD containing building objects OBJ, scenes and/or e.g. text data. Images provided by the scanning device 2-$i$ such as a camera can be uploaded in a possible embodiment to a remote server of a cloud platform including at least one trained artificial intelligence module 3-$i$. The number or function can be triggered to call a recognition algorithm retrieving the images and returning labels L for the detected image. The retrieved labels L can be used for generating training data applied to the artificial intelligence module 3-$i$ in a training phase TPH and/or during an operational inference phase IPH of the system 1. Derived labels L can be provided in a possible embodiment with associated search indices. In some embodiments, the scan data SD comprises images which may be captured by a NavVis M6 Trolley forming a moveable robot 4 to provide photorealistic point clouds and comprising 360° images provided by fisheye cameras. A QR code can contain in a possible embodiment any details and/or information of the scanned building object next to it. Scan data SD can include the position and places of the respective building object at the correct coordinates within the digital twin DT.

In some embodiments, the scanned detected and classified object can comprise a static object mounted in the building at a fixed position. Accordingly, the computer-implemented methods and systems 1 can be used for a wide range of different use cases for any kind of buildings to detect and classify a plurality of building objects OBJ installed within the respective building.

In some embodiments, building objects OBJ can be detected based on coordinates of a predetermined space or room within a building. If in the digital twin DT BIM data model building objects OBJ are provided with associated coordinates. These building objects OBJ can be selected as possible candidate building objects OBJ such that the at least one scanner 2-$i$ of the detection system 1 can be focused on the area indicated by the coordinates to detect a physical building object at the indicated location. In some embodiments, the scanner 2-$i$ can be moved automatically e.g. by a moveable robot 4 to the indicated location to scan the surrounding of the indicated location. It can then be determined whether the possible candidate building object of the digital twin DT indicated by its coordinates does really exist as a physical building object at the indicated location. This allows to check by the detection system 1 whether individual building objects OBJ of a planned building have been installed in the built physical building. After successful validation that the building object has been installed at the planned location (coordinates) the scanner 2-$i$ can transfer in real time the generated scan data SD to the artificial intelligence module 3.

Some embodiments include a method for training an artificial intelligence module 3 implemented in a processing unit 5 of a building object detection system 1. FIG. 5 shows a flowchart of a possible embodiment of such a training method performed in a training phase TPH.

In a first step $S1_{TPH}$, object identifiers OBJ-ID are physically attached within a vicinity of building objects OBJ installed in the respective building. The object identifiers OBJ-ID can for instance comprise QR codes printed on stickers attached in the surrounding of a building object such as a smoke detector. The QR code printed on the sticker can in a possible embodiment be attached to the ceiling of the room within a predefined radius r around the corresponding physical building object, i.e. the smoke detector. Depending on the form of the building object, the object identifier OBJ-ID can also be attached on the housing of the respective building object.

In a further step $S2_{TPH}$, a space within the building is scanned by a scanner 2 to generate scanning data of the respective scanned space. The scanner 2 can be mounted to a moveable driving robot 4. The driving robot 4 is moving within a room of the building and is adapted to scan the surrounding room or space.

In a further step $S3_{TPH}$, the generated scan data SD is processed to derive automatically labels L from the object identifiers OBJ-ID included in the scan data SD. The scan data SD can for instance comprise an image of an area where an object identifier OBJ-ID is located in the vicinity of a corresponding building object. The generated image captures the object identifier OBJ-ID and the corresponding building object. By processing the image data, it is possible to detect the object identifier OBJ-ID such as a two-dimensional QR barcode and derive from the object identifier automatically the label L associated with the corresponding building object included in the same image.

In a further step $S4_{TPH}$, the scan data SD such as the image is automatically annotated with the derived label L to provide labelled training data which can be stored in a database 8 of the system 1.

In a further step $S5_{TPH}$, the artificial intelligence module 3 is trained with the labeled training data LTD. The artificial intelligence module 3 trained in this way can then be used in an inference phase IPH to detect and classify also building objects OBJ which do not have associated object identifiers OBJ-ID as illustrated in the flowchart of FIG. 2. Accordingly, the trained method allows to train an artificial intelligence module 3 on the basis of building objects OBJ provided in the field having attached object identifiers OBJ-ID. This has the advantage that only a part of the building objects OBJ installed in the building have to be provided with attached physical object identifiers OBJ-ID such as QR code stickers to provide a trained artificial intelligence module 3 having the capacity and ability to detect and classify a plurality of other physical building objects OBJ installed in the same or in another building but not having attached physical object identifiers OBJ-ID in their vicinity.

Consequently, the training process becomes more efficient. During operation of the system 1, the labeled training database 8 can still be increased. The building object detection system 1 according to the present invention is labeled to train itself and to be automatically optimized. For example, in a building having several floors, the building objects OBJ installed in the first floor may be attached by an operator with object identifiers OBJ-ID placed within the vicinity of the labeled building objects OBJ. The building objects OBJ and the attached object identifiers OBJ-ID can be used to provide labeled training data LTD used to train the artificial intelligence module 3 of the system 1. Then, the moveable driving robot 4 with the scanners 2 can be placed into the next floor of the building to process the generated scan data SD for detection and classification of the building objects OBJ installed within the next floor of the building. The training data provided by the building objects OBJ in the first floor can be sufficient to train the artificial intelligence module 3 so that it is not necessary to attach object identifiers OBJ-ID also to the building objects OBJ in the next, i.e. second floor of the building to provide classification results.

In some embodiments, the object identifiers OBJ-ID used for providing labeled training data LTD for the artificial intelligence module 3 can comprise hierarchical classifiers and/or object attributes. For example, a hierarchical object identifier OBJ-ID for a smoke detector can comprise several hierarchical classifiers such as follows. A first classifier can indicate that the building object (e.g. smoke detector) is a building object installed at the ceiling of a room. The next classifier of the hierarchical object identifier OBJ-ID can indicate that the building object is a fire detection element.

The next classifier of the hierarchical object identifier OBJ-ID can indicate that the building object is a smoke detector. Further, the next classifier of the hierarchical object identifier OBJ-ID can indicate a type of the respective smoke detector. By using hierarchical object identifiers OBJ-ID, the training of the artificial intelligence module 3 can be facilitated and the performance of the training procedure can be increased.

In some embodiments, the object identifiers OBJ-ID placed in the vicinity of the installed building objects OBJ and used for providing labeled training data LTD for the artificial intelligence module 3 can provide absolute or relative position information. For instance, a QR code forming an object identifier OBJ-ID of a smoke detector attached in the vicinity of the smoke detector can indicate a relative position of the corresponding smoke detector. For instance, the object identifier OBJ-ID or QR code can indicate that the corresponding smoke detector is located on the left side of the object identifier OBJ-ID. The absolute or relative position encoded in the object identifier OBJ-ID can also facilitate the training process and increase the efficiency of the training procedure. With the training method according to the present invention, the time-consuming and cumbersome learning process can be significantly alleviated since the object identifier OBJ-ID such as the QR code can include an exact description of the respective building object, e.g. hierarchical classifiers.

A building object description can be also provided by a link indicated by the object identifier OBJ-ID such as an QR code. Accordingly, in a possible implementation, the object identifier OBJ-ID can also comprise a code used to indicate a link to a data source comprising the exact description of the associated building object. Additionally, a comparatively high number of building objects OBJ have to be provided with object identifiers OBJ-ID such as QR codes. With the increasing number of scans provided by scanners 2, the number of objects which have to be provided with object identifiers OBJ-ID can be reduced significantly because the building object to be detected and characterized are already stored in the database 8 of the system 1.

Consequently, the system 1 can automatically expand its training database 8 when performing the computer-implemented method for detecting building objects OBJ installed within a building. By learning on the fly, the building object detection system 1 is continuously increasing its performance. Each scan generates a plurality of training data at different locations and at varying environmental conditions for the same building objects OBJ associated to the same object identifier OBJ-ID. This provides an advantage for training the artificial intelligence module 3.

As soon as a building object has been detected, it can be annotated at the detected position. The new position of the detected building object can be georeferenced. This position can be transferred into the BIM data model. This allows to annotate the building object in a two-dimensional or three-dimensional building plan. The detected object can be integrated into the digital twin DT of the building.

Further, the detected building object can be linked to neighboring building objects OBJ or elements located for instance at the same ceiling or wall of the building. In some embodiments, it can be verified whether an installed building object does or does not fulfill a predefined installation rule IR. It is possible to detect automatically whether a classified building object at a specific determined location does fulfill an associated installation rule IR. In case that the installation rule IR is violated, an operator may be directed to the building object, for instance to change its position at the wall or ceiling. A plurality of different installation rules IR for different types of building objects OBJ can be stored in a database 8.

These installation rules IR can vary depending on the location of the building, for instance in which country the building is located. Depending on the exact position of the building, a different set of installation rules IR can be loaded from the database 8 of the building object detection system 1. For instance, if the building is located in Munich, the installation rules IR for Germany can be downloaded from the database 8 of the building object detection system 1. In some embodiments, if the installation rules IR exist for a building object corresponding installation rules IR can be set up or defined by a user U using a corresponding editor. Accordingly, the installation rules IR can be defined according to best practice experiences of a user U. The stored installation rules IR can increase the quality of the object detection and classification. For instance, a message can be automatically generated if according to an installation rule IR a specific building object such as a smoke detector should have been mounted at a ceiling of a building room, however, has not been detected at the requested position within the scan area of the scanner 2 of the building object detection system 1.

Accordingly, if a necessary building object such as a smoke detector has not been detected in a room of a building, a corresponding alarm message can be generated automatically and may trigger countermeasures performed by an operator.

Furthermore, if a building object is detected which should not be at the scanned area that may be safety-critical, a corresponding alarm message can be triggered automatically and an operator can be directed to the position of the detected unwanted building object to remove the building object from the indicated position. Accordingly, the building object detection systems 1 are able to detect wrong placements of building objects OBJ within the building and to generate automatically corresponding messages to a user U of the building object detection system 1. The building can comprise office rooms or living flats. Further, the building can also comprise industrial facilities such as plants.

Figure 6:
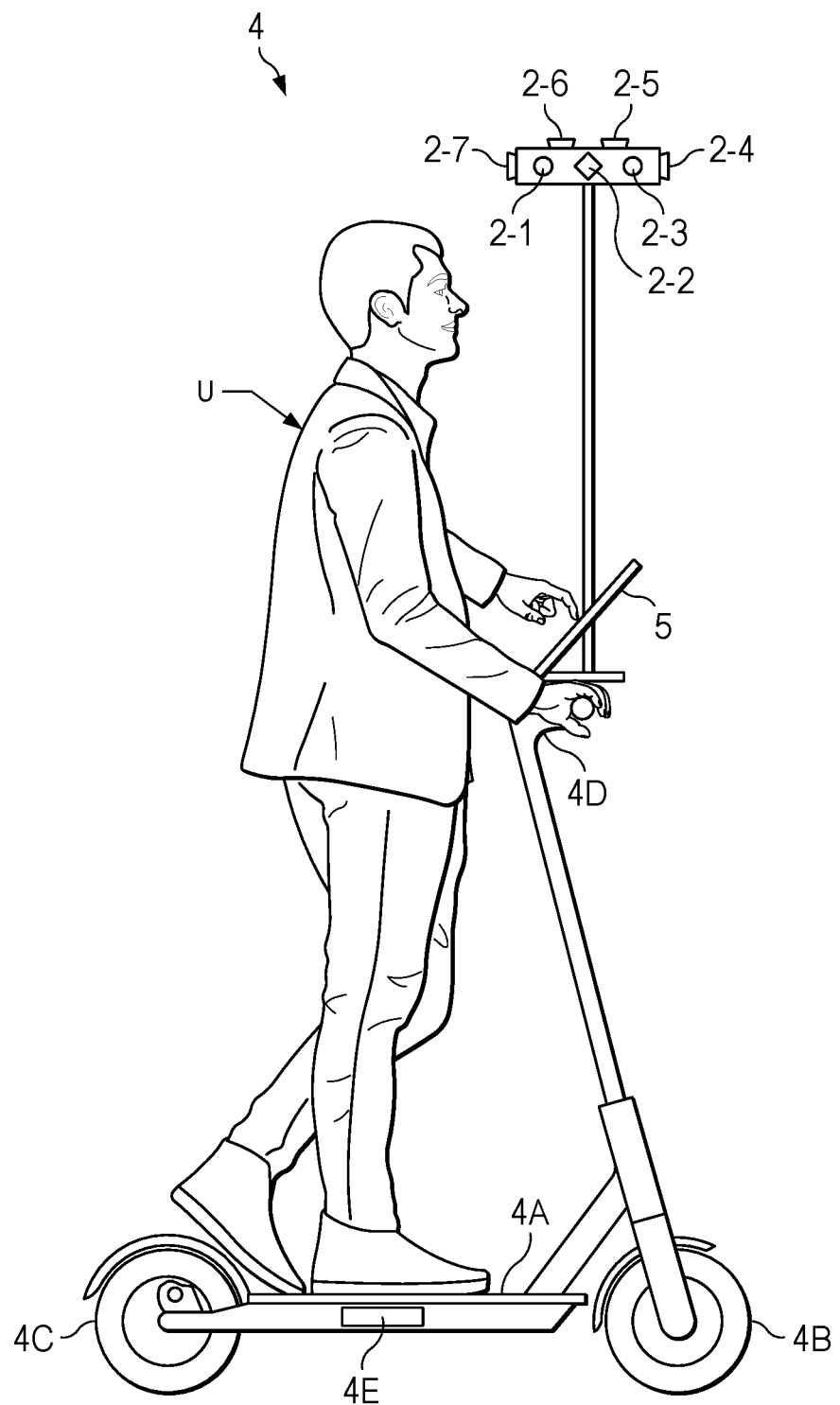
FIG. 6 shows an embodiment of a driving robot used by a building object detection system incorporating teachings of the present disclosure.

FIG. 6 shows a possible exemplary embodiment of a driving robot 4 which can be used in a building object detection system 1 as also illustrated in the block diagram of FIG. 1. The driving robot 4 can comprise scanners 2 to automatically capture point clouds, 360° immersive imaginary data as well as sensor data when moving with a walking speed through a building. The driving robot 4 comprises in the illustrated embodiment a platform 4A to carry an operator or user U as shown in FIG. 6. The platform 4A is mounted on wheels 4B, 4C to move on a ground floor of a room within the building. Different kinds of scanners 2-1 to 2-7 can be mounted on top of the driving robot 4 to generate automatically scan data SD of the scanned space around the driving robot 4. The scanners 2 can provide point cloud data, image data, radar data and/or acoustic data.

In some embodiments, a processing unit 5 can be also integrated in the driving robot 4 as shown in FIG. 6. The processing unit 5 can for instance comprise a laptop or tablet attached to the driving robot 4 structure. The processing unit 5 can comprise a graphical user U interface GUI which can be operated by the user U. The driving robot 4 can also comprise a handle 4D to provide stability to the user U during the movement of the driving robot 4 through the building and/or to steer the driving robot 4. The driving robot 4 can comprise a motor, in particular an electro motor 4E, for operating the wheels. The processing unit 5 can receive the scan data SD from the scanners 2-i. In a possible embodiment, the processing unit 5 of the driving robot 4 can comprise a communication interface to forward the scan data SD to another processing unit having an integrated artificial intelligence module 3.

In some embodiments, the artificial intelligence module 3 can also be integrated in the processing unit 5 of the driving robot as shown in FIG. 6. In some embodiments, the scan data SD received from the scanners 2 can be processed in real time to detect and classify building objects OBJ installed within the scanned space around the driving robot 4. The moveable driving robot 4 allows to capture indoor building data faster and easier. A real-time feedback on the screen of the graphical user U interface GUI allows the operator or user U to keep track of areas already scanned. The moveable driving robot 4 can keep up scanning on uneven ground, upramps, down ramps and narrow corridors or other spaces of the building. Featuring 6DSLAM allows to move the scan robot device 4 in six degrees of freedom allowing for a versatile scanning of the surrounding. Scan or process data SD can be stored on a removable SSD drive. The stored data can be transferred via a communication interface to other workstations or to a server of a cloud platform. Several laser scanners can be provided to capture high-density point clouds while a number of cameras take high-resolution pictures that provide immersive 360° walkthroughs. The moveable driving robot 4 provides survey-grade point clouds even while moving. The accuracy can be even improved by including SLAM anchor surveying markers. SLAM anchors comprise ground control points which can increase accuracy and can automate georeferencing during data processing. The moveable driving robot 4 can be designed in a possible implementation for easy transport in a trunk of a car or in a suitcase.

In some embodiments, the scan data SD provided by the scanners 2 of the moveable driving robot 4 are processed to detect automatically building objects OBJ. In some embodiments, first, an object identifier OBJ-ID is detected. Starting from the detected object identifier OBJ-ID, a scan can be initiated around the detected object identifier OBJ-ID to provide scan data SD processed to detect a building object such as a smoke detector in the vicinity of the detected object identifier OBJ-ID.

A building object detection system 1 incorporating teachings of the present disclosure and associated computer-implemented methods can be used for a wide range of applications. For example, the building object detection system 1 can be used to verify whether a building comprises the mandatory building objects OBJ, in particular the security-relevant building objects OBJ or elements such as smoke detectors.

Further, differences between a constructed physical building and the building plan of the respective building can be detected automatically to trigger amendments or changes within the physical constructed building. Further, it can be verified by the building object detection system 1 whether all required installation rules IR at the location of the building have been fulfilled by the constructed physical building. This makes it possible to perform an automatic approval procedure for approving a constructed physical building in a specific state or region.

Further, in case of an unwanted event such as a fire damaging the building, it can be proven by the building operator that all required installation rules IR have been fulfilled. Moreover, by verifying that all installation rules IR have been fulfilled in the planning and construction of the building, the probability that such unwanted events like fires do occur is significantly reduced. The building object detection system 1 can be used for any building where building objects OBJ are installed according to installation rules IR. These buildings can comprise office buildings, hotels, cruising ships, apartment blocks or houses. The buildings can also comprise public buildings, in particular transportation buildings such as airports, ship harbors or train stations. The buildings can also comprise tunnels or other infrastructure buildings used for transportation of goods or persons. In some embodiments, the driving robot 4 can also comprise a navigation unit linked to a navigation platform adapted to navigate the driving robot 4 automatically through the investigated building of interest. The moveable driving robot 4 can be either manually controlled by the transported user U and/or remote-controlled by the navigation system 1. The processing of the scan data SD can be performed in a possible embodiment in real time. For instance, if a building object of interest has been detected or classified, the area around the interesting building object can be investigated more thoroughly. For example, if a building object of interest has been detected and classified by the building object detection system 1, the moveable driving robot 4 can be navigated to the area of the detected building objects OBJ to perform additional scans by the scanners 2 of the robot 4. Additional scans can be performed by the same or different scanner devices 2 of the moveable robot 4.

After having analyzed and processed the scan data SD of the detected building object, additional actions can be triggered such as removing the detected building object from the building. In some embodiments, scan data SD can also be processed to determine automatically an operation state of a detected building object. For example, an additional scanner 2 can be activated to determine a current operation state of a detected building object. For instance, in a primitive example, if a lamp mounted to a ceiling of a room of the building has been detected, a sensor can provide sensor data indicating whether the detected lamp is switched on or is switched off. Further, the scan data SD can also indicate whether the installed lamp is flickering. The detected operation state of the detected building object can be notified to the platform for triggering corresponding measures. For instance, if a scan data SD indicates that the detected building object such as a lamp is faulty or in an undesired operation state, the detected building object can be repaired or replaced. In some embodiments, the building object detection system 1 can be linked to a maintenance system 1 improving the maintenance of a plurality of building objects OBJ installed within a building.

What is claimed is:

1. A building object detection system for detecting building objects installed at fixed predefined positions in a building, the system comprising:
   a processing unit;
   a scanner to scan a space within the building and generate scan data of the space;
   an artificial intelligence module implemented on the processing unit and trained to process the scan data to detect and automatically classify building objects installed within the space;
   wherein the artificial intelligence module is trained by the processing unit using labeled training data comprising labels derived from scan data of previously scanned building objects provided with associated object identifiers within the vicinity of the respective installed building objects;
   a database storing different types of building objects and associated installation rules; and
   a verification unit programmed to verify the classification of a building object based on compliance with the installation rules within buildings stored in the database;
   wherein a second set of installation rules is loaded from the database based at least in part on a location of the building.

2. The system according to claim 1, further comprising a robot, wherein:
   the scanner is mounted to the robot; and
   the robot moves within the building to alternative spaces within said building to detect and classify building objects installed within the building.

3. The system according to claim 1, wherein the scan data comprise point cloud data, image data, radar data, and/or acoustic data.

4. The system according to claim 1, wherein the trained artificial intelligence module comprises a trained deep neural network.

5. The system according to claim 1, wherein:
   the trained artificial intelligence module receives scan data from multiple scanners; and
   the verification unit verifies a classification of a building object identified by scan data provided from a first scanner based on scan data provided by a second scanner.

6. The system according to claim 1, wherein:
   the database stores the detected and classified building objects installed within the scanned spaces of the building;
   a processing unit generates a digital twin of the scanned physical building; and
   the digital twin includes a real-time digital replica of the scanned physical building.

7. The system according to claim 6, wherein the processing unit compares the digital twin with a digital planning model of same building stored in the database to automatically detect deviations between the physical scanned building and the planned building.

8. The system according to claim 6, wherein the scanner is automatically moved to a location within the building indicated by coordinates of a building object specified in a digital twin of the building to scan the surrounding of the indicated location.

9. The system according to claim 1, wherein the scan data comprises georeferenced scan data processed by a processor to determine a position of the detected building object.

10. The system according to claim 9, wherein the determined position of the detected and classified building object is compared with building plan data of the building to verify the classification of the respective building object performed by the trained artificial intelligence module.

11. The system according to claim 1, wherein the building object detected and classified by the artificial intelligence module is provided with annotation data and stored in the database.

12. The system according to claim 1, wherein the building objects comprise at least one item selected from the group consisting of:
- security and alarm installation devices;
- communication installation devices;
- artificial lighting devices, electrical switches, electrical sockets, power supply lines;
- energy supply installation devices, heating and cooling installation devices, ventilation installation devices;
- water supply, drainage installation devices;
- escalators, lift installation devices, windows, and doors.

13. The system according to claim 1, wherein the object identifiers used for providing labeled training data comprise hierarchical classifications and/or object attributes.

14. The system according to claim 1, wherein the object identifiers include absolute or relative position information.

15. A method for detecting building objects installed at fixed predefined positions within a building, the method comprising:
- scanning a space within the building to generate scan data; and
- processing the scan data using an artificial intelligence module to detect and automatically classify building objects installed within the space;
- wherein the artificial intelligence module is trained with labeled training data comprising labels derived from previously scanned building objects provided with associated object identifiers within the vicinity of the respective installed building objects;
- wherein different types of building objects and associated installation rules are stored in a database;
- loading a second set of installation rules from the database based at least in part on a position of a location of the building; and
- verifying the classification of a building object based on the second set of installation rules.

16. A method for training an artificial intelligence module implemented in a processing unit of a building object detection system, the method comprising:
- physically attaching object identifiers within a vicinity of building objects installed in the building;
- scanning a space within the building to generate scan data;
- processing the scan data to derive labels from the object identifiers included in the scan data;
- annotating the scan data with the derived labels to provide labeled training data;
- training the artificial intelligence module with the labeled training data; and
- storing different types of building objects and associated installation rules in a database.

* * * * *